(12) United States Patent
Agrawala et al.

(10) Patent No.: US 6,320,865 B1
(45) Date of Patent: Nov. 20, 2001

(54) METHOD AND APPARATUS FOR IMPLEMENTING TIME-BASED DATA FLOW CONTROL AND NETWORK IMPLEMENTATION THEREOF

(75) Inventors: Ashok K. Agrawala, Ashton, MD (US); Christopher A. Landauer, Falls Church, VA (US); Sung Lee, Silver Spring, MD (US)

(73) Assignee: University of Maryland at College Park, College Park, MD (US)

( * ) Notice: Subject to any disclaimer, the term of this patent is extended or adjusted under 35 U.S.C. 154(b) by 0 days.

(21) Appl. No.: 08/871,533

(22) Filed: Jun. 9, 1997

Related U.S. Application Data

(60) Provisional application No. 60/019,548, filed on Jun. 10, 1996.

(51) Int. Cl.[7] .................................................. H04L 12/56
(52) U.S. Cl. ........................ 370/413; 370/369; 370/400
(58) Field of Search ................................. 370/395, 400, 370/413, 428, 429, 369, 370, 372, 375

(56) References Cited

U.S. PATENT DOCUMENTS

| | | |
|---|---|---|
| 5,218,680 | 6/1993 | Farrell et al. . |
| 5,343,468 | 8/1994 | Rau . |
| 5,550,873 | 8/1996 | Dolev et al. . |
| 5,563,885 | 10/1996 | Witchey . |
| 5,581,550 | 12/1996 | Boyer et al. . |
| 5,583,859 * | 12/1996 | Feldmeier ............................ 370/471 |
| 5,805,589 * | 9/1998 | Hochschild et al. ................. 370/412 |
| 5,867,663 * | 2/1999 | McClure et al. ..................... 370/413 |
| 5,872,769 * | 2/1999 | Caldara et al. ...................... 370/413 |

* cited by examiner

*Primary Examiner*—Chi H. Pham
*Assistant Examiner*—Frank Duong
(74) *Attorney, Agent, or Firm*—Dykema, Gossett, PLLC

(57) ABSTRACT

Nodes in a network transmit information among one another without the need for identifying headers. A calendar is maintained, indicating the times at which various data chunks are to be sent. When a request is made, the calendar is checked to see whether resources are free to accommodate the request. If so, the calendar is revised to reserve resources for the request.

12 Claims, 2 Drawing Sheets

METHOD AND APPARATUS FOR IMPLEMENTING TIME-BASED DATA FLOW CONTROL AND NETWORK IMPLEMENTATION THEREOF

REFERENCE TO RELATED APPLICATION

This application claims the benefit of U.S. Provisional Application Ser. No. 60/019,548 filed Jun. 10, 1996, whose disclosure is hereby incorporated by reference in its entirety into the present disclosure.

FIELD OF THE INVENTION

The present invention is directed to method and apparatus for controlling the flow of data chunks in time and to a network using the same.

DESCRIPTION OF RELATED ART

Since the inception of computer networks, the design thereof has been based on providing on-demand service in an environment dominated by unreliable, failure-prone networks and hosts. To overcome this difficulty, network design has traditionally been based on the concepts of datagram routing and end-to-end protocols that depend on minimal knowledge of the network state.

However, reliance on these concepts is also the fundamental cause of the major performance problems of current networks, where congestion, long delays, and packet losses are common occurrences. For example, TCP (the transfer control protocol used in the Internet) has ultra-conservative flow control because message round-trip times are its only knowledge of the current network state.

The design of any complex system has to rely on dynamic information in decision making. Most system designs make specific provisions for generating, collecting, and using such information. Traditionally distributed systems have been designed using a customer-based model, in which customers carry with them logical information to servers. In this approach, all resource allocation is done on demand, leading to problems such as congestion and other queuing bottlenecks. The extent of congestion and queues depends on the variability of customer arrival times, on service needs, and on the resource allocation mechanisms used by the system components. The Internet is a good example of such a system.

SUMMARY OF THE INVENTION

An object of the invention is to provide for the transfer of data in chunks among a plurality of nodes on a network on a space-time basis.

Another object of the invention is to provide end-to-end, jitter-free, loss-free transfer of data among nodes in a network.

A further object of the invention is to provide such transfer of data with minimum latency.

A further object of the invention is to provide such transfer of data with maximum bandwidth.

A further object of the invention is to provide such transfer of data with improved security.

To these and other objects, the present invention is directed to a device for transferring data in chunks among a plurality of nodes on a network, comprising: incoming buffer means for storing the chunks received from the plurality of nodes; outgoing buffer means for storing the chunks to be sent to the plurality of nodes; controller means for determining times in which the chunks are to be transferred among the plurality of nodes; and switch means for switching each of the chunks from a portion of the incoming buffer means corresponding to one of the nodes to a portion of the outgoing buffer means corresponding to another one of the nodes at times determined by the controller means.

In the device times are determined in the controller means by: (i) maintaining a schedule indicating an order in which the chunks are to be transferred; (ii) accepting transfer requests from the plurality of nodes; (iii) determining which of the transfer requests can be satisfied in accordance with the schedule; and (iv) revising the schedule in accordance with those of the transfer requests that can be satisfied; and the switch means operated on schedule as revised by the controller means.

The invention is further directed to a method of transferring data in chunks among a plurality of nodes on a network, the method comprising: (a) storing the chunks received from the plurality of nodes in an incoming buffer means; (b) storing the chunks to be sent to the plurality of nodes in an outgoing buffer means; (c) determining times in which the chunks are to be transferred among the plurality of nodes; and (d) switching each of the chunks from a portion of the incoming buffer means corresponding to one of the nodes to a portion of the outgoing buffer means corresponding to another one of the nodes at times determined by the determining step (c).

In the method the determining step includes (i) maintaining a schedule indicating an order in which the chunks are to be transferred; (ii) accepting transfer requests from the plurality of nodes; (iii) determining which of the transfer requests can be satisfied in accordance with the schedule as revised in step (c)(iv).

The present invention is based on the principle that the time of an event carries information that, when used judiciously, can lead to a much simpler design of the system.

The provision of data chunks without a requirement for headers improves both bandwidth and security. Because no bandwidth must be devoted to headers, up to 99.8% of the bandwidth may be devoted to usable data. Furthermore, if a network connection is tapped, the intercepted data chunks do not necessarily include identifying information and thus, like strips of shredded documents, cannot readily be reassembled.

BRIEF DESCRIPTION OF THE DRAWINGS

An exemplary embodiment of the present invention will now be set forth in detail with reference to the drawings, in which.

DETAILED DESCRIPTION OF THE PREFERRED EMBODIMENTS

The exemplary embodiment of the invention for transfer of data in chunks on a space and time basis on a network, referred to herein as Cyclone, will now be set forth in detail. As used herein chunks may be defined as a predetermined or predefined number of bits.

Figure 1:
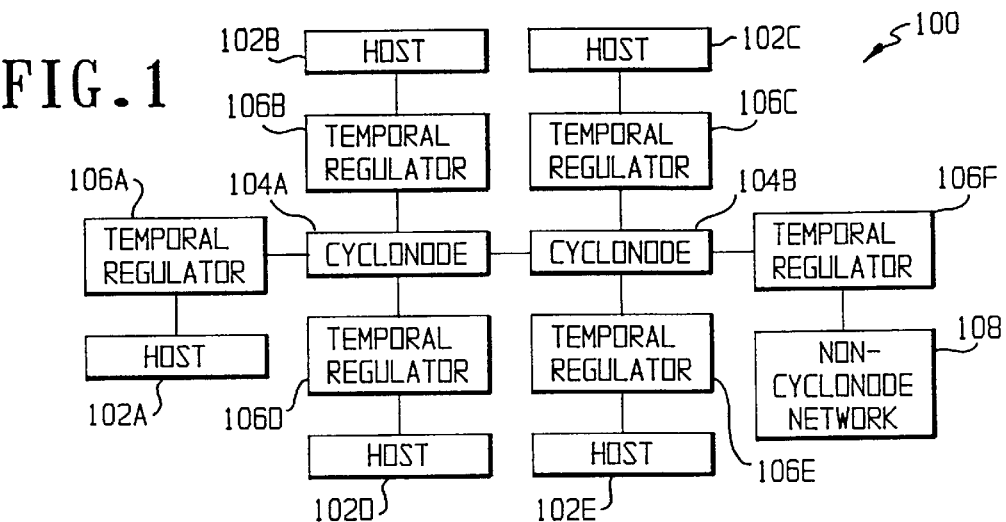
FIG. 1 shows a network in accordance with the present invention.

FIG. 1 shows a network constructed according to Cyclone technology. In network 100, data are transferred among hosts 102A, 102B, 102C, 102D, 102E by way of nodes 104A, 104B, called Cyclonodes. The structure and operation of each Cyclonode will be described in detail below with reference to FIG. 2. Each host interfaces with its Cyclonode by way of temporal regulator 106A, 106B, 106C, 106D, or 106E. The structure and operation of each temporal regulator will be described in detail below with reference to FIG. 3. Network 100 can also communicate with non-Cyclone network 108 by way of temporal regulator 106F. Thus, non-Cyclone network 108 appears on the Cyclone network 100 as another host. For example, network 100 can be connected to the Internet in this manner.

Figure 2:
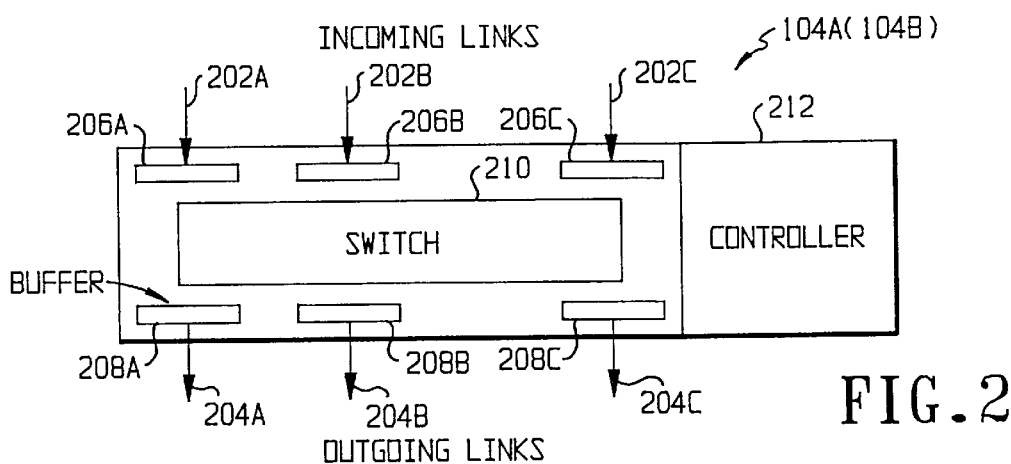
FIG. 2 shows a node used in the network of FIG. 1.

In the exemplary embodiment, Cyclonodes 104A and 104B have the same internal structure, shown in FIG. 2. Cyclonode 104A (104B) is connected to a plurality of incoming links 202A, 202B, 202C and a plurality of outgoing links 204A, 204B, 204C. The incoming and outgoing links are unidirectional links that operate by DMA (direct memory access) to allow data transfer among the Cyclonodes or between a Cyclonode and a temporal regulator. Each of the incoming links is connected to a corresponding one of incoming buffers 206A, 206B, 206C, while each of the outgoing links is connected to a corresponding one of outgoing buffers 208A, 208B, 208C. Each Cyclonode is implemented on a workstation.

Of course, the number of links and buffers shown is purely illustrative; any number can be used as needed for any particular network configuration. Moreover, while the exemplary embodiment is implemented with point-to-point links, other kinds of links can be used.

Figure 5:
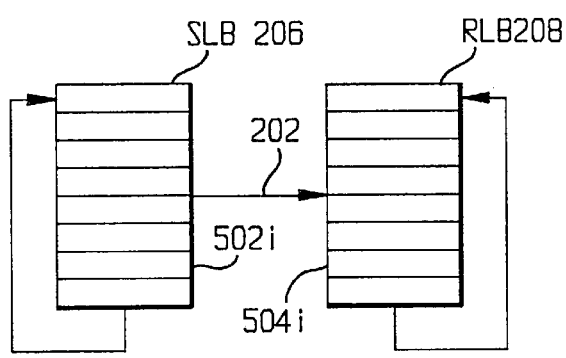
FIG. 5 shows the relationship between the buffers on either side of a link.

A link is a point-to-point data path which connects a Cyclonode to another Cyclonode or to a temporal regulator. A link operates continuously moving chunks from the send side to the receive side, or, more specifically, from a send side logical buffer (SLB) (such as outgoing buffer 208A of a Cyclonode) to a receive side logical buffer (RLB) (such as incoming buffer 206A of another Cyclonode). As shown in FIG. 5, a logical buffer is a collection of buffers, each capable of holding one chunk, and organized in a sequence. Each buffer has a time tag, such as time tag i appended to buffers 502$i$ and 504$i$ of FIG. 5. In other words, a logical buffer is a buffer-based representation of time with respect to the link.

For the buffers of the SLB, the time tag indicates the time at which the transmission of the chunk in the buffer begins. For the RLB, the time tag indicates the time when the reception of the chunk in this buffer begins. Note that for any buffer in the SLB, for a link there is a buffer in the RLB. The time tags for the two corresponding buffers differ by the link delay.

As all chunks are of the same size, knowledge of the link speed allows a determination for each buffer of the time when the send or receive operation will end. This time is generally the time tag for the next buffer.

As a link is considered to operate continuously, in principle a logical buffer contains an infinite number of buffers. In practice, a finite number of buffers is used for a physical implementation of a logical buffer by reusing the buffers. The number of physical buffers required to implement a logical buffer depends on the operating characteristics of the Cyclone network and the cycle time chosen for the cyclic operations.

In Cyclone, the transfer of information on a link is controlled from the send side. Therefore, the timing information about the operation of a link is tied to the clock of the sender Cyclonode. However, as the RLB is a part of the receiving Cyclonode, the sender clock information becomes visible to that Cyclonode and can be used for clock drift adjustments.

The Cyclonode provides the functions of a store and forward switch. To move chunks to another location in the network, switch 210 shown in FIG. 2 transfers the chunks from the logical buffer of the incoming link 202A, 202B, . . . , to a logical buffer of a desired time tag of an outgoing link 204A, 204B, . . . The data moving operation, therefore, preferably relies on the addresses of the two buffers with their defined time tags and therefore is preferably carried out after the time on the tag of the in buffer and before the time on the tag of the out buffer. This is carried out in a temporally determinate manner by maintaining a calendar for the switch operations in controller 212. Because the incoming links bring in chunks at specified times and the outgoing links send out chunks at specified times, no header lookup is required. More than one switch 210 can be provided.

Controller 212 is responsible for generating and updating the calendars for the switch(es) and the links, and managing the operations and functions of the Cyclonode. Controller 212 is responsible for connection establishment and connection teardown functions. When a communication task request comes to a Cyclonode, the controller looks up a routing table to determine the outgoing link for the connection to be used for this request. Then, based on the temporal profile information, it modifies the calendar for the switch. The calendar and the specifics of its modification will be described in detail below.

In the exemplary embodiment, there is only one switch at a Cyclonode which carries out all data movement functions. The switch can operate, e.g., by mapping an address in memory corresponding to a certain incoming logical buffer to a certain outgoing logical buffer. If there are multiple switches, a separate calendar for each is required and used for the operation of that switch.

Even though the links operate continuously, a calendar is required for them to indicate when each link is sending information chunks and where the source of the information is. The Cyclonode maintains and uses a calendar for the switch. During normal operation, the only actions carried out by the Cyclonode are by its switch, which, according to its calendar, moves chunks from the RLB of a link to SLB of another link. Controller sets up a connection when it modifies the calendar for the switch to accommodate the new connection.

Figure 3:
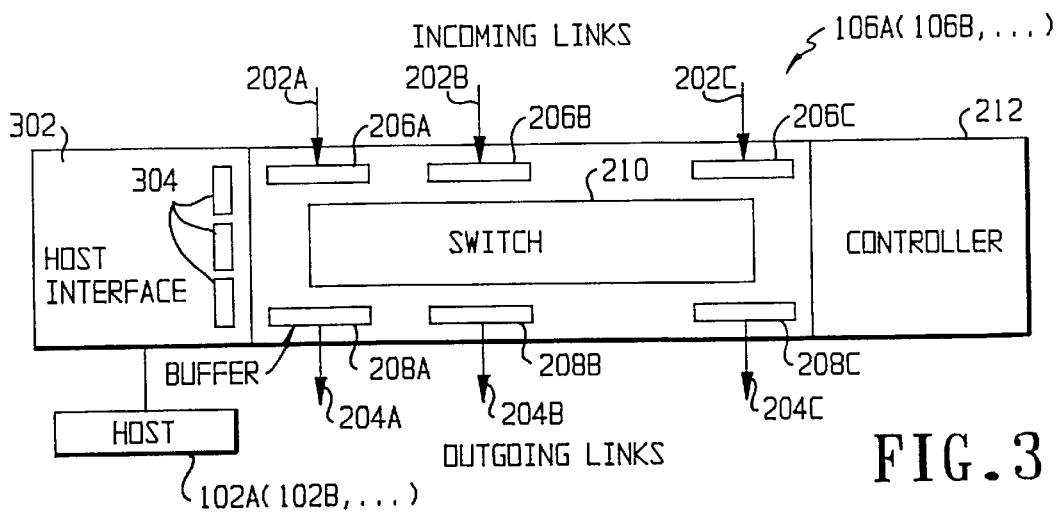
FIG. 3 shows a temporal regulator used in the network of FIG. 1

FIG. 3 shows a temporal regulator (TR) 106A (106B). The structure and functionality of temporal regulator 106A (106B, . . . ) are based on those of Cyclonode 104A (104B). In addition, the temporal regulator includes host interface 302 for connection to host 102A (102B, . . . ). The host interface maintains logical buffers 304 for sending and receiving information. The switch moves information between link logical buffers 206A, . . . , 208A, . . . , and host logical buffers 304. The host interface is responsible for moving the information between the host logical buffers and the host. As logical buffers have times attached to each buffer, when information is put in the logical buffers, the information acquires a specific temporal profile that serves in the place of a packed header. The temporal regulator, like the Cyclonode, is implemented on a workstation.

An important function of the host interface is to carry out temporal matching between the temporal characteristics of the arriving or departing chunks and the information as generated or consumed by the host. Logical buffers 304 are used for this purpose.

From the network's point of view, the TR has the capability of generating traffic with a defined temporal profile on one side and of accepting traffic with a defined temporal profile on the other side. In this regard, the TR provides the capability of temporal matching. Thus, a temporal regulator can be used to provide temporal matching in order to interface Cyclone networks with hosts and with other networks.

When a TR is used to interface a Cyclone network with another network, as shown in FIG. 1, the temporal variability of the other network is absorbed through the use of buffers by the TR, so that for the Cyclone network, the communication goes on in the usual temporally defined manner.

Figure 4:
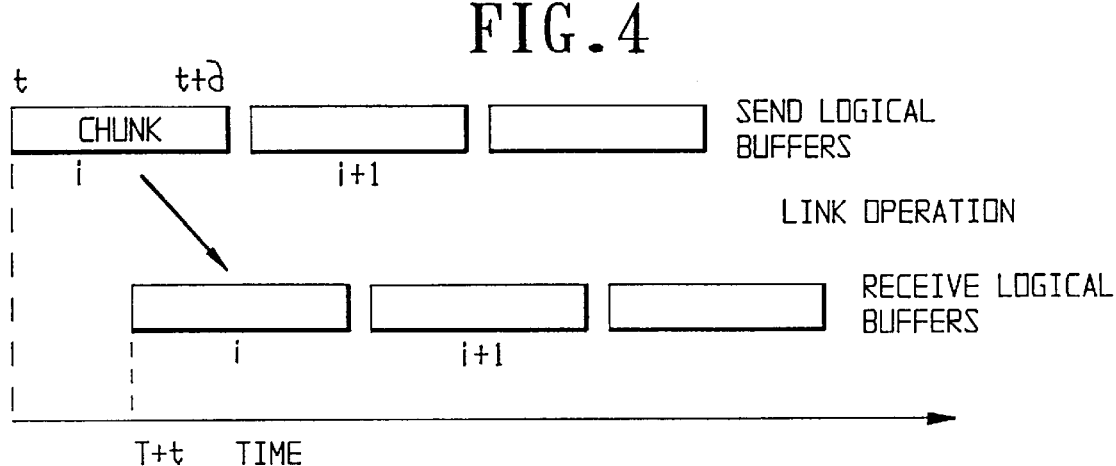
FIG. 4 shows a time delay between sending and receiving a chunk.

The operation of the Cyclone network will now be described. First, it will be useful to describe the time aspects of a link in greater detail. As shown in FIG. 4, data are divided into chunks designated i,i+1, . . . , of time duration $\partial$. Each buffer holds one such chunk. For a buffer in the SLB, the link starts moving the chunk in it at time t and continues the send operation until time (t+$\partial$). The receive buffer RLB which receives this chunk starts receiving at time (T+t), where T is the link latency.

The value of a depends on the link speed and the chunk size. The buffers of the SLB are organized in a sequential manner, and after transferring the chunk in buffer i of the SLB to buffer i of the RLB, the sender starts to transfer the contents of buffer (i+1) at time (t+$\partial$). The link thus operates continuously.

Since the basic operation of a Cyclone link is in terms of moving one chunk, the time may be viewed in terms of slots of size $\partial$. As a consequence, there is a one-to-one correspondence between time slots and buffers on both the send and receive sides of a Cyclone link. As the link operates continuously, if there are no data to send in a time slot, the buffer of SLB for that slot will be empty, thus resulting in an empty buffer of the RLB.

The traffic to be handled by the network is treated as a collection of communication tasks. A communication task includes the following:

Data to be moved;

Sender/receiver identifications;

Sending temporal profile, which is a time-based description of how much information will be available to send and when;

Desired receiving temporal profile, which is a time-based description of when the data are expected at the receiving end for use; and Quality of service (QOS).

Time windows may be specified for the desired range of time over which data or components thereof should reach the receiver.

There is no limit on the complexity of the temporal profile for a communication task. For example, the temporal profile for an MPEG stream (a known video data format) can be specified by a non-cyclic temporal profile that takes into account the type and size of frames. Similarly complex temporal profiles can be generated for other applications.

When a host initiates a communication task, it sends the temporal profiles, QOS, and source/destination information to the TR which forwards the request to the network using a control connection which is maintained for all links. At the receiving node the request is processed by the controller, which examines the routing table to determine the identity of the outgoing link. The controller then examines the requested temporal profile and the current calendar for the outgoing link. If the request can be accommodated, the controller proceeds to modify the calendar for the link by making temporary entries in the calendar for this connection, and to adjust the temporal profile of the current request to conform to the calendar for the link. In this manner, the request continues until it reaches the receiving TR. A confirmation is sent by the receiving TR along the same path to indicate the acceptance of the connection. All nodes on the path then change the calendar entries from temporary to confirmed. The acceptance also contains with it the accepted temporal profile which is to be used by the sending TR to send data chunks. In this situation all connections are opened for enough time to send the data of the size in the original request. A control message to tear down a connection before it has sent all the data may be made by the sending TR, with the appropriate action being taken by the nodes.

Any node can reject a connection request if it finds that the outgoing link or the switch cannot meet the request. Some capacity of every link is reserved for control messages such as connection requests, connection teardown requests, and routing information.

A communication task datum is received by the TR connected to the host originating the communication task and is sent to the Cyclonode by this TR following the temporal profile established within the network when this task was accepted. At each of the Cyclonodes along the path, the chunk in a buffer of the RLB for the link is moved to a buffer of the SLB of an outgoing link which is then moved to the next Cyclonode by the link. This process continues until the chunk reaches the receiving TR which forwards it to the receiving host according to the host requirements. This process continues for all chunks in the communication task.

Routing is accomplished in the following manner. The controller for a node maintains a routing table which is used to determine the outgoing link towards a destination TR during connection establishment. The routing table is modified only when failure or recovery occurs. Any standard routing techniques can be used for this purpose.

The temporal determinacy of data movement through a Cyclonode is achieved through the use of calendar-based operation of switch 210 of FIG. 2. The switch should be fast enough to keep up with all the incoming links. If it is not fast enough, the time taken and the delays caused by the switch have to be reflected in the calendars and thereby in the temporal profiles.

Links operate as passive entities in that they continuously transfer the data from their SLB to their RLB. As buffers have time tags, it is known exactly what will be moved, and when, without the need for headers.

A Cyclone network carries out end-to-end resource reservations for each communication task. This resource reservation is carried out for the whole duration of the communication, and the temporal profile of the communication can be determined at any point along the path from the sending TR to the receiving TR for the communication task.

An important aspect of the Cyclone approach is the ability to build calendars efficiently and to manage time without significant overhead and waste of resources. The result is an efficient technique for time-based scheduling of multiple resources, reflecting the constraints among the requests as well as the resources.

The scheduling technique uses a link model shown in FIG. 5. According to this link model, a point-to-point link 202 connects two buffers which are operated as circular buffers. These buffers are sending logical buffer (SLB) 206 and receiving logical buffer (RLB) 208. The buffers on both sides use the same slot numbering system, so that the same number i indicates both slot 502i in the SLB and slot 504i in the RLB. The timing is determined by the sending side.

This number i, called a time tag, allows a finite number of buffers, as the management of time is carried out in defined cycles. The length of a cycle can be long, with multiple entries for a connection in each cycle. Effectively, there is a major cycle containing multiple minor cycles.

Figure 6:
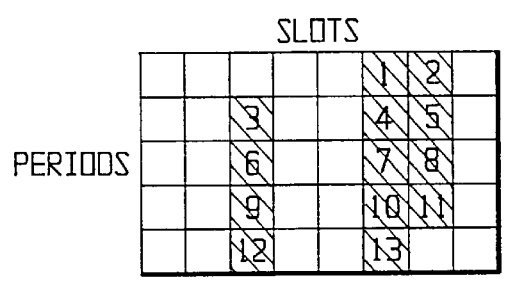
FIG. 6 shows an array of data to be sent, organized by periods and slots.

The management of time will become clearer with reference to FIG. 6. This figure shows time organized into a matrix of periods P and slots s. Thus, time can be represented as (P,s). The numbered chunks contain information that, absent a change in schedule, are to be sent at the times shown.

Due to the pre-allocation of resources, chunks sustain a minimum wait as they move through the network. As the operations are synchronized in time, no congestions will occur in the Cyclone network. The major buffering requirement is pushed to the host or TR level, which are at the boundaries of the network. Because the Cyclone network maintains an end-to-end view and control for each communication task, there will be no temporal variabilities due to congestion. The causes for temporal variabilities in this network are typical natural variabilities in the communication delays in the links and clock drifts. As long as the clock drifts are small, they can be handled efficiently in a known manner.

In Cyclone, each node operates in a cyclic manner with a fixed common cycle time. The variability in the startup time in the cycle is reflected in the schedules generated for the nodes. It is required, however, that the clocks of the nodes not drift with respect to each other. A receiving node, by monitoring the time when a chunk is received, can determine its time drift relative to the sending node. Thus, time can be synchronized to within a microsecond.

In cycle time T, a total of N chunks are transferred to a node. The last of the N chunks in a cycle is used as a control channel, and the controller examines the information received in that control channel. Such a control channel can be implemented by giving a buffer address to a slot that does not correspond to an outgoing link. The sender can use the control channel to send control information to the receiver. Any unassigned slot can be used as the control channel.

In the cyclic operation the sender may send the request in the slot in which the sender schedules the incoming connection request. The temporal profile for the connection request contains the slot identifier(s) assigned by the sender to this connection request. Note that a connection may use more than one slot in a cycle. The receiver maintains its own relative numbering of the slots and accepts the request in its receiver slot. The receiver then goes through the routing process to determine the outgoing link on which this connection has to go. The receiver then determines the slot(s) on the outgoing link which occur(s) after the slot(s) of the incoming link and can be assigned to this request. Using the first of those slots, the receiver passes on the request to the next node. The request continues this way to the receiver TR which sends a confirmation back for the connection.

In order to carry out the connection establishment properly, the time delays in making the request and the confirmation, roughly two round-trip times (in other words, two-way handshaking), are taken into account. The entries made by any controller in the schedule in the form of the list of buffer address becomes operational only some time later. This time delay is organized in terms of the minimum number of cycles of length T necessary for this purpose.

Figure 7:
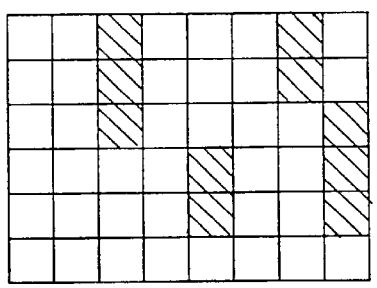
FIG. 7 shows a calendar in which resources have been allocated, organized by periods and slots.
Figure 8:
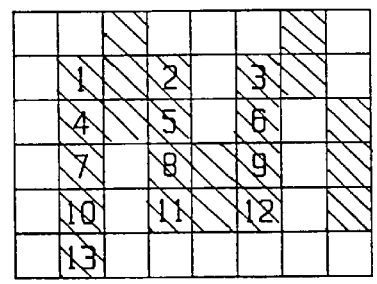
FIG. 8 shows the calendar of FIG. 7 after revision to allow the transmission of the data of FIG. 6.

Suppose that the requester desires to send the data in the numbered chunks of FIG. 6. Suppose further that the current calendar has slots allocated as shown in FIG. 7. The calendar is revised to include the numbered chunks; the resulting calendar is shown in FIG. 8. On the other hand, if not enough resource were available, the request would be rejected.

The primary limiting factor in the performance of the Cyclone network is the memory bandwidth of the workstations. Due to the support of DMA by the link adapters, no buffer copying is required. However, each byte has to be written and then read. Therefore, the upper limit of throughput of a Cyclonode is half the memory bandwidth, unless dual-ported memory is used. However, the memory requirement at the node is only kN chunks, where k is the number of links and N is the number of slots in a cycle.

For example, there are commonly available memories with 60 ns access time for 8 bytes. That means that the memory bandwidth for such memories is 66.67 Mbyte/sec (528 Mbit/sec). As no processing is required for any chunks coming through the node, this is the upper limit of the sustained throughput at this node. Further, as the scheduling of chunks is done at connection establishment time, the throughput in Bytes/sec is not effected by chunk size.

In practice, some memory bandwidth will also be used by the CPU, reducing the throughput further. However, some compensation may be provided by employing a special purpose memory for the switch operation or by having buffers on the link adaptor cards to which another link adaptor can write directly. When such a special purpose memory is used, a bus fast enough to connect the link adapters is required. To improve the performance further, the switch may be implemented in hardware.

While an exemplary embodiment of the invention has been set forth above, those skilled in the art who have reviewed this disclosure will appreciate that many modifications can be made. For example, ATM designs recognize the following bit rates in traffic: constant bit rate, variable bit rate, available bit rate, and unspecified bit rate. These and other, more complex characteristics can be handled by varying the operations performed in the TR's. Also, while chunk size is treated as fixed, variable chunk size can be implemented. The modifications set forth in this disclosure can be combined with one another or with other modifications as needed. Therefore, the present invention should be considered to be limited only by the appended claims.

We claim:

1. A device for synchronously transferring data in chunks pursuant to accepted transfer requests from among a plurality of nodes on a network, the device comprising
  incoming buffer means for storing the chunks received from the plurality of nodes;
  outgoing buffer means for storing the chunks to be sent to the plurality of nodes;
  controller means for determining an order and time in which the chunks are to be transferred among the plurality of nodes by:
    (i) maintaining an end-to-end coordinated schedule for synchronous operation indicating an order and time in which the chunks are to be transferred pursuant to transfer requests already accepted;
(ii) accepting new transfer requests for data in chunks from the plurality of nodes;
(iii) determining which of the new transfer requests can be satisfied in accordance with the schedule without affecting any of the already accepted transfer requests; and
(iv) revising the schedule in accordance with those of the new transfer requests that can be satisfied; and
switch means for switching each of the chunks from a portion of the incoming buffer means corresponding to one of the nodes to a portion of the outgoing buffer means corresponding to another one of the notes at times determined by the schedule as revised by the control means.

2. The device of claim 1, further comprising host interface means, connected to a host that generates a first portion of the data contained in some of the chunks and uses a second portion of the data contained in others of the chunks, for:
(i) buffering the first portion of the data from a time in which the host generates the first portion of the data until a time in which the calendar permits transmission of the first portion of the data; and
(ii) buffering the second portion of the data from a time in which the calendar permits transmission of the second portion of the data until a time in which the host uses the second portion of the data.

3. The method of claim 1, further comprising link means for connecting (i) the incoming buffer means of the device to an outgoing buffer means of at least one other device on the network and (ii) the outgoing buffer means of the device to an incoming buffer means of said at least one other device on the network.

4. A method for synchronously transferring data in chunks pursuant to accepted transfer request from among a plurality of nodes on a network, the method comprising:
(a) storing the chunks received from the plurality of nodes in an incoming buffer means;
(b) storing the chunks to be sent to the plurality of nodes in an outgoing buffer means;
(c) determining an order and time in which the chunks are to be transferred among the plurality of nodes by:
(i) maintaining an end-to-end coordinated schedule for synchronous operation indicating an order and time at which the chunks are to be transferred;
(ii) accepting new transfer requests for data in chunks from the plurality of nodes;
(iii) determining which of the transfer requests can be satisfied in accordance with the schedule without affecting any of the already accepted transfer requests; and
(iv) revising the schedule in accordance with the those of the transfer requests that can be satisfied; and
(d) switching each of the chunks from a portion of the incoming buffer means corresponding to one of the nodes to a portion of the outgoing buffer means corresponding to another one of the nodes at times determined by the schedule as revised in step (c) (iv).

5. The method of claim 4, further comprising:
(e) interfacing the network with a host that generates a first portion of the data contained in some of the chunks and uses a second portion of the data contained in others of the chunks by:
(i) buffering the first portion of the data from a time in which the host generates the first portion of the data until a time in which the calendar permits transmission of the first portion of the data; and
(ii) buffering the second portion of the data from a time in which the calendar permits transmission of the second portion of the data until a time in which the host uses the second portion of the data.

6. A data network for synchronously transmitting data in chunks pursuant to accepted transfer requests, the data network comprising:
a plurality of hosts including a sending host for sending the data and a receiving host for receiving the data;
a plurality of intermediate nodes interconnecting the plurality of hosts;
wherein each of the plurality of intermediate nodes comprises;
(i) incoming buffer means for storing the chunks when the chunks are received in said each of the plurality of intermediate nodes;
(ii) outgoing buffer means for storing the chunks to be sent from said each of the plurality of intermediate nodes;
(iii) controller means for determining an order and time in which the chunks are to be transferred by:
(I) maintaining an end-to-end coordinated schedule for synchronous operation indicating an order and time at which the chunks are to be transferred
(II) accepting new transfer requests for data in chunks from the sending host and from others of the plurality of intermediate nodes;
(III) determining which of the transfer requests can be satisfied in accordance with the schedule without affecting any of the already accepted transfer requests; and
(IV) revising the schedule in accordance with the those of the new transfer requests that can be satisfied; and
(iv) switch means for switching each of the chunks from a portion of the incoming buffer means to a porting of the outgoing buffer means at times determined by the schedule as revised by the control means.

7. The data network of claim 6, further comprising routing table means for maintaining and storing a routing table indicating an arrangement in which the plurality of intermediate nodes interconnect the plurality of hosts, wherein the controller means of each of the plurality of nodes consults the routing table to determine a route for sending the chunks from the sending host to the receiving host.

8. The data network of claim 6, wherein the plurality of nodes comprise a subplurality of nodes each of which is connected directly to a corresponding one of the plurality of hosts, and wherein each of the subplurality of nodes further comprises host interface means, connected to the corresponding one of the plurality of hosts, for:
(i) buffering a first set of chunks generated by the corresponding one of the plurality of hosts from a time in which the corresponding one of the hosts generates the first set of chunks until a time in which the calendar permits transmission of the first set of chunks; and
(ii) buffering a second set of chunks to be used by the corresponding one of the hosts from a time in which the calendar permits transmission of the second set of chunks until a time in which the corresponding one of the plurality of hosts uses the second set of chunks.

9. A method for synchronously transmitting data in chunks pursuant to accepted transfer requests from a sending host to a receiving host in a data network that comprises (i) a plurality of hosts including the sending host and the receiving host and (ii) a plurality of intermediate nodes interconnecting the plurality of hosts, each of the plurality of intermediate nodes comprising incoming buffer means for buffering incoming ones of the chunks and outgoing buffer means for buffering outgoing ones of the chunks, the method comprising:

(a) sending a new request from the sending host to the receiving host;

(b) determining a path through the plurality of intermediate nodes along which the data are to be sent from the sending host to the receiving host; and (c) at each intermediate node along the path:
(i) maintaining an end-to end coordinated schedule for synchronous operation indicating an order and time at which the chunks are to be transferred;
(ii) determining whether the new request can be satisfied in accordance with the schedule;
(iii) revising the schedule in accordance with the new request if the request can be satisfied without affecting any of the already accepted requests; and
(iv) switching each of the chunks from a portion of the incoming buffer means to a portion of the outgoing buffer means at times determined by the schedule as revised in step (c) (iii).

10. The method of claim 9, further comprising maintaining and storing a routing table indicating an arrangement in which the plurality of intermediate nodes interconnect the plurality of hosts, wherein step (b) is performed in accordance with the routing table.

11. A device for synchronously transferring data in chunks among a plurality of nodes on a network on a space time basis comprising:

incoming buffer means for storing the chunks received from the plurality of nodes;

outgoing buffer means for storing the chunks to be sent to the plurality of nodes;

controller means for determining an order and time in which each of the chunks is to be transferred among the plurality of nodes; and switch means for switching each of the chunks from a portion of the incoming buffer means corresponding to one of the nodes to a portion of the outgoing buffer means corresponding to another one of the nodes at times determined by the controller.

12. A method for synchronously transferring data in chunks pursuant to accepted transfer requests from among a plurality of nodes on a network on a space and time basis comprising the steps of:

(a) storing the accepted chunks received from the plurality of nodes in an incoming buffer means;

(b) storing the accepted chunks to be sent to the plurality of nodes in at least one of an outgoing buffer means or a pointer to a chunk in the incoming buffer;

(c) determining an order and time for each step in end-to-end movement in which the chunks are to be transferred among the plurality of nodes; and (d) switching each of the chunks from a portion of the incoming buffer means corresponding to one of the nodes to a portion of the outgoing buffer means corresponding to another one of the nodes at the times determined by the determining step (c).

* * * * *